(12) United States Patent
Cantlon

(10) Patent No.: US 7,578,324 B2
(45) Date of Patent: Aug. 25, 2009

(54) SELF-CENTERING TOOL

(75) Inventor: Nathan Cantlon, Charlo, MT (US)

(73) Assignee: Jore Corporation, Ronan, MT (US)

( * ) Notice: Subject to any disclaimer, the term of this patent is extended or adjusted under 35 U.S.C. 154(b) by 0 days.

(21) Appl. No.: 10/835,894

(22) Filed: Apr. 30, 2004

(65) Prior Publication Data

US 2004/0218988 A1 Nov. 4, 2004

Related U.S. Application Data

(60) Provisional application No. 60/467,269, filed on Apr. 30, 2003.

(51) Int. Cl.
*B23B 51/00* (2006.01)

(52) U.S. Cl. .............................. 144/136.95; 408/203.5; 408/204

(58) Field of Classification Search .............. 144/135.2, 144/136.1, 136.95, 154.5; 408/203.5–206, 408/207, 209, 201
See application file for complete search history.

(56) References Cited

U.S. PATENT DOCUMENTS

| | | | | | |
|---|---|---|---|---|---|
| 2,484,150 | A | * | 10/1949 | Brown | 408/204 |
| 4,129,401 | A | * | 12/1978 | Berthier | 408/59 |
| 4,408,935 | A | * | 10/1983 | Miyanaga | 408/206 |
| 4,490,080 | A | * | 12/1984 | Kezran | 408/112 |
| 5,062,748 | A | * | 11/1991 | Kishida | 408/206 |
| 5,205,685 | A | * | 4/1993 | Herbert | 408/204 |
| 5,316,418 | A | * | 5/1994 | Miyanaga | 408/201 |
| 5,435,672 | A | * | 7/1995 | Hall et al. | 408/68 |
| 5,810,524 | A | * | 9/1998 | Wirth et al. | 408/203.5 |

* cited by examiner

*Primary Examiner*—Shelley Self
(74) *Attorney, Agent, or Firm*—Christensen O'Connor Johnson Kindness PLLC

(57) ABSTRACT

A bit (20) for a tool is provided. The bit includes a housing (22) having a cutting portion (24) and a shank (26). The bit also includes a post (40) disposed within the housing and positioned to assist in anchoring the bit to a workpiece (52) during use.

16 Claims, 3 Drawing Sheets

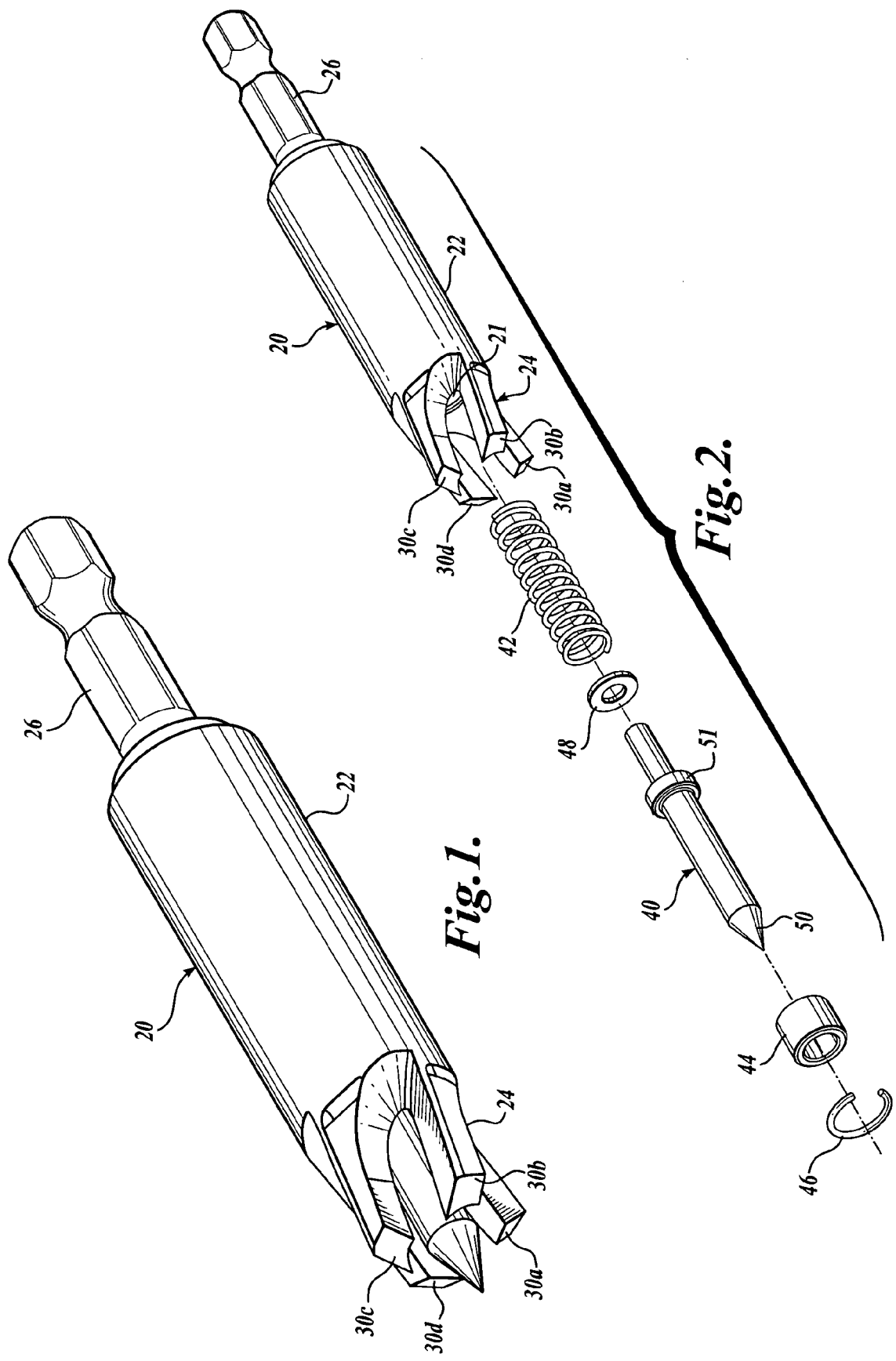

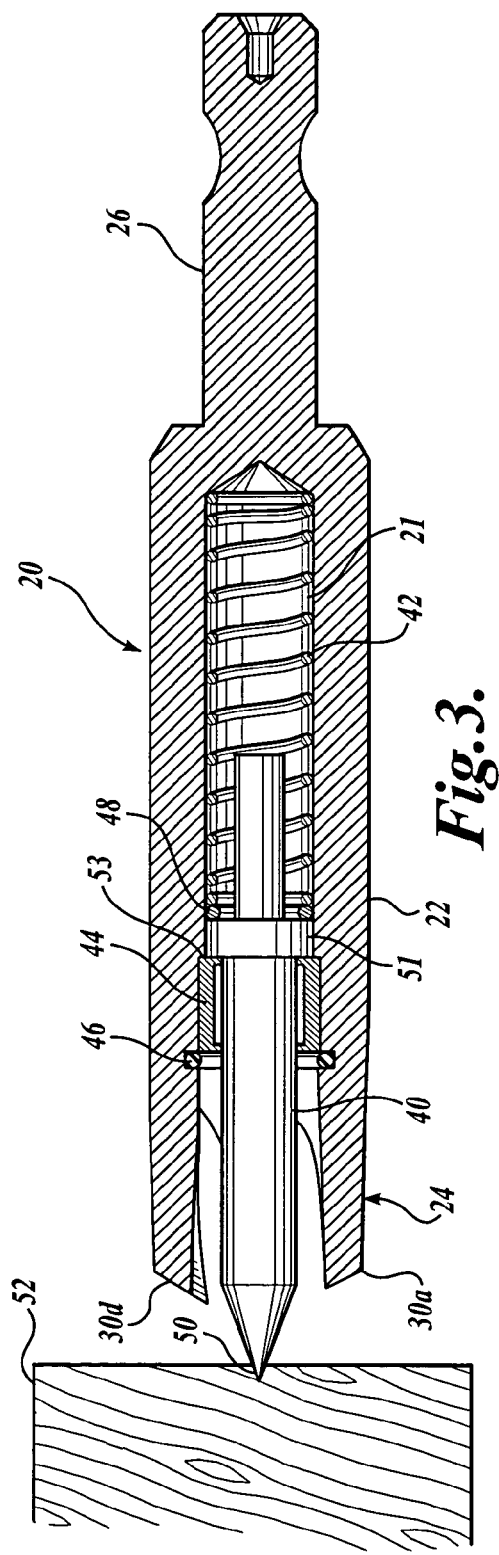
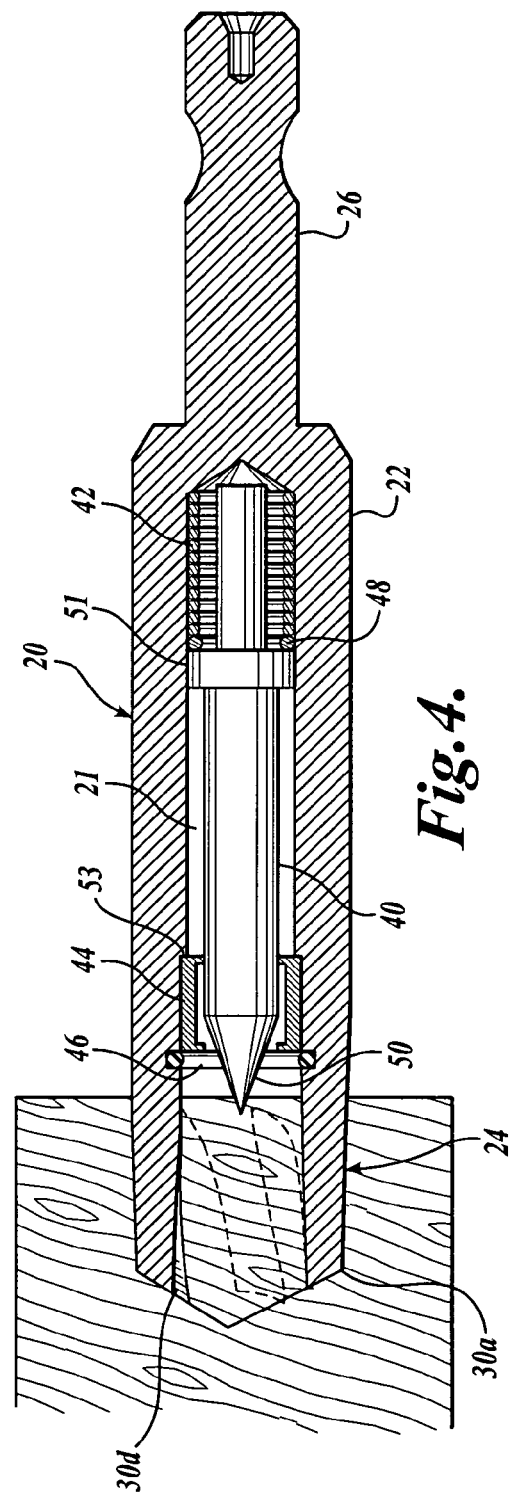
Fig.3.
Fig.4.

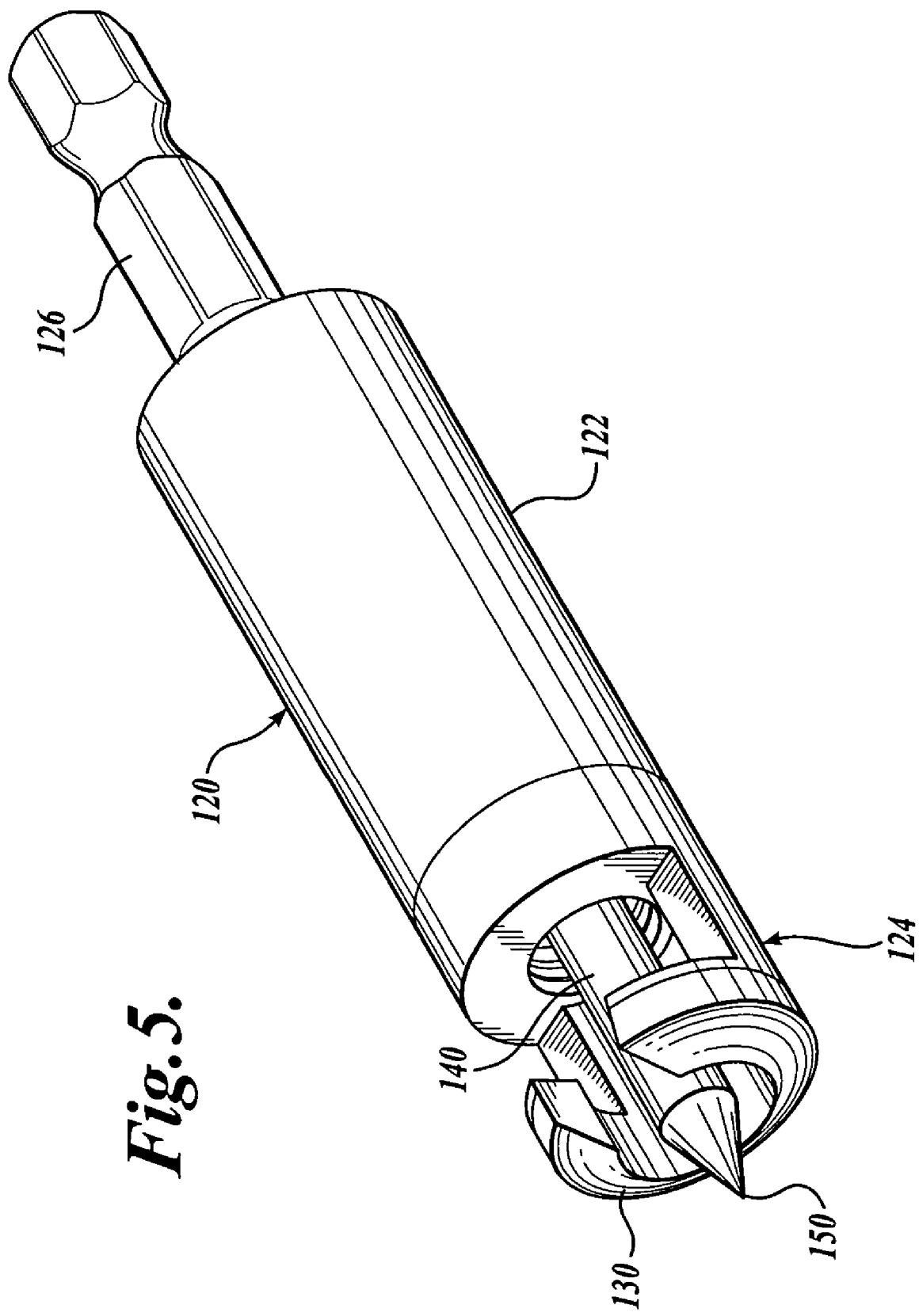

SELF-CENTERING TOOL

CROSS-REFERENCE TO RELATED APPLICATION

This application claims the benefit of Provisional Application No. 60/467,269, filed Apr. 30, 2003, the disclosure of which is hereby expressly incorporated by reference.

FIELD OF THE INVENTION

The present invention relates generally to wood working tools and, in particular, to plug cutters.

BACKGROUND OF THE INVENTION

Wooden plugs are often used to fill holes in a workpiece to conceal fasteners and screws that have been set below the surface of the workpiece. Typically, a wooden plug having a length greater than the depth of the cavity in which the fastener is seated is cut from a section of wood. The plug is then glued within the cavity and the section of the plug extending from the workpiece is trimmed and sanded, such that the plug is flush with the workpiece to conceal the fastener.

In the past, such wooden plugs have been cut using a plug cutter attachable to a drill press. Certain plug cutters include a plurality of cutting surfaces adapted to cut a shaped plug from wood. The plug cutter is pressed against a piece of wood and drilled to form the shaped plug. The plug is then removed from the piece of wood by chipping or cutting wood away from the base of the plug. Although such plug cutters are effective at cutting wooden plugs, they are not without their problems.

As a non-limiting example, existing plug cutters, when initially cutting wood to form a plug, may spin along the surface of the wood before the cutting prongs are set within the wood. This is also true if a tool operator uses a hand drill to drive the plug cutter. As a result, and regardless of whether a drill press or a hand drill is used to drive the plug cutter, existing plug cutters are potentially dangerous to the tool operator as the plug cutter may slide across the surface of the wood until and unless the plug cutter is set within the wood. Also, such sliding motion damages the surface of the wood, thereby resulting in waste wood product.

Thus, although existing plug cutters are effective at cutting wood plugs, there exists a need for improved plug cutters that assist in retaining the plug cutter in a localized area of the wood during initial cutting of the plug.

SUMMARY OF THE INVENTION

In accordance with one embodiment of the present invention, a bit for a tool is provided. The bit includes a housing having a cutting portion and a shank. The bit also includes a post disposed within the housing and positioned to assist in anchoring the bit to a workpiece during use. In accordance with further aspects of this embodiment, the bit includes a biasing member disposed within the housing and positioned to urge the post into an extended position.

In accordance with another embodiment of the present invention, a bit for a tool is provided. The bit includes a housing having a cutting portion and a shank, and a post. The post is slidably disposed within the housing and is positioned to assist in retaining the bit in a localized area of a workpiece during use. In yet another embodiment, the bit further includes a biasing member disposed within the housing and positioned to reciprocate the post between an extended position and a retracted position in response to a drilling pressure applied to the bit.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 1 is an isometric view of a bit for a tool formed in accordance with one embodiment of the present invention;

FIG. 2 is an exploded, isometric view of the bit of FIG. 1;

FIG. 3 is a cross-sectional, side planar view of the bit of FIG. 1 showing the post in an extended position;

FIG. 4 is a cross-sectional, side planar view of the bit of FIG. 3, showing the post in a retracted position; and FIG. 5 is an isometric view of a bit for a tool formed in accordance with a second embodiment of the present invention.

DETAILED DESCRIPTION OF THE PREFERRED EMBODIMENT

FIG. 1 illustrates a plug cutter 20 formed in accordance with one embodiment of the present invention. The plug cutter 20 includes a housing 22 having a cutting portion 24 formed at one end and a shank 26 formed at the other end of the housing 22. The cutting portion 24 includes a plurality of cutting tines 30a-30d. The cutting tines 30a-30d are suitably disposed around a perimeter of the housing 22.

The shank 26 is suitably integrally formed with the housing 22 and is sized and constructed in a well-known shape, such as a hex shank, for coupling to a hand drill (not shown) or table mounted drill press (not shown). Although the shank 26 is geometrically illustrated as a hex-shaped shank, other geometries are also within the scope of the present invention. For example, the geometry of the shank 26 could be flat, round, tri-flat, square, polygonal, or splined. As a result, such geometrically shaped shanks are also within the scope of the present invention. Further, although the housing 22 is illustrated and described as having an integrally formed shank 26, other types of housing, such as a multi-piece housing, are also within the scope of the present invention.

As may be best seen by referring to FIG. 2, the plug cutter 20 includes a post 40 slidably disposed within a cavity 21 of the housing 22 on a biasing member 42, such as a helical spring. Although the biasing member 42 is illustrated as a helical spring, it should be apparent that other types of biasing members are also within the scope of the present invention. As an example, an elastomeric spring or a plurality of springs, are also within the scope of equivalent structures for a biasing member of the present invention. Accordingly, other types of biasing members, and their structural equivalents, are also within the scope of the present invention.

The cavity 21 extends partially through the longitudinal direction of the housing 22. The cavity 21 is sized and geometrically shaped to receive the post 40 therein.

The post 40 is retained within the housing 22 by a retaining collar 44, a round spring 46, and a washer 48. The post 40 includes a pointed retaining end 50 for assisting in restraining or centering the plug cutter 20 relative to a workpiece during use, as is described in greater detail below.

As may be best seen by referring to FIGS. 3 and 4, the post 40 is slidably or reciprocally mounted within the cavity 21 of the housing 22 on the biasing member 42. The washer 48 is disposed between one end of the biasing member 42 and a face of a shoulder 51 extending around the perimeter of one end of the post 40. The retaining collar 44 is slidably received and seated against a stepped annular shoulder 53 integrally formed within the cavity 21. The retaining collar 44 is thus positioned to retain the post 40 within the housing 22 during use and illustrated in FIG. 3. The retaining collar 44 is suitably retained within the cavity 21 by the round spring 46. As disposed within the cavity 21, the post 40 is slidably received within the cavity 21, and the biasing member 42 assists in reciprocating the post 40 between an extended and retracted position.

Operation of the plug cutter 20 may be best understood by referring to FIGS. 3 and 4. As seen in FIG. 3, the plug cutter 20 is shown in the extended position, wherein the retaining end 50 of the post 40 is partially received within a workpiece 52, such as a section of wood. As received within the workpiece 52, the post 40 assists in retaining and/or centering the plug cutter 20 relative to the workpiece 52 during initial and continued drilling of the plug cutter 20 into the workpiece 52.

During use, the plug 40 is displaced into a retracted position (FIG. 4) within the cavity 21 of the housing 22 in response to a drilling pressure applied to the plug cutter 20. Because of the interference of the retaining end 50 of the plug 40 with the workpiece 52 during drilling operation of the plug cutter 20, the post 40 assists in retaining and/or centering the plug cutter 20 relative to the workpiece 52 to minimize the risk of injury to a drill operator.

As may be best seen by referring to FIG. 5, a plug cutter 120 formed in accordance with a second embodiment of the present invention will now be described in greater detail. The plug cutter 120 is identical in materials and operation to the embodiments described above with the exception that the plurality of cutting tines 30*a*-30*d* formed with the housing 22 have been replaced with a single, radially-shaped cutting surface 130. Such a cutting surface is well known in the art.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bit for a tool, comprising:
   (a) a housing having a cutting portion and a shank;
   (b) a post disposed within the housing, wherein the post is operably coupled to the housing and movable between extended and retracted positions and allowing substantially unconstrained rotation of the post relative to the housing when the post is in the extended position, wherein the post extends from the cutting portion of the housing when the post is in the extended position and is positioned to contact a workpiece and assist in anchoring the bit to the workpiece during use; and
   (c) a biasing member disposed within the housing and positioned to urge the post into the extended position.

2. The bit of claim 1, wherein the post is slidably disposed within the housing on the biasing member.

3. The bit of claim 1, wherein the bit is a plug cutter.

4. The bit of claim 1, wherein the post slidably retracts within the housing when drilling pressure is applied to the bit.

5. A bit for a tool, comprising:
   (a) a housing having a cutting portion and a shank; and
   (b) a post reciprocally and slidably disposed within the housing allowing movement of the post between an extended position and a retracted position and substantially unrestrained rotation of the post relative to the housing when the post is in the extended position, wherein the post extends from the cutting portion of the housing when the post is in the extended position and is positioned to assist in retaining the bit in a localize area of a work piece during use.

6. The bit of claim 5, further comprising a biasing member disposed within the housing and positioned to reciprocate the post between the extended position and the retracted position in response to a drilling pressure applied to the bit.

7. The bit of claim 6, wherein the post assists in centering the bit relative to a workpiece during use.

8. A bit for a tool, comprising:
   (a) a housing having a cutting portion and a shank;
   (b) a post moveably disposed within the housing configured for movement between an extended position and a retracted position and allowing substantially unconstrained rotation when the post is in the extended position, wherein the post extends from the cutting portion of the housing when the post is in the extended position and is positioned to assist in centering the bit relative to a workpiece during use;
   (c) a bearing surface between the housing and the post; and
   (d) a biasing member disposed within the housing and positioned for reciprocating movement of the post.

9. The bit of claim 8, wherein the biasing member disposed within the housing is positioned to reciprocate the post between the extended position and the retracted position in response to a drilling pressure applied to the bit.

10. A bit for a tool, comprising:
    (a) a housing having a cutting portion and a shank;
    (b) a post slidably disposed within the housing between extended and retracted positions and allowing unconstrained rotation in an extended position, wherein the post extends from the cuffing portion of the housing when the post is in the extended position and is positioned to assist in anchoring the bit to a workpiece when an initial drilling pressure is applied during use; and
    (c) a biasing member disposed within the housing and positioned to normally urge the post into the extended position.

11. A bit for a tool, comprising:
    (a) a housing having a cuffing portion and a shank;
    (b) a post disposed within the housing for at least translational movement between an extended position and a retracted position and rotational movement within the housing, wherein the post extends beyond the cuffing portion of the housing when the post is in the extended position and is positioned to assist in anchoring the bit to a workpiece during use and wherein the post is capable of translational and rotational movement within the housing when the post is in the extended position; and
    (c) a biasing member disposed within the housing and positioned to urge the post into the extended position.

12. The bit of claim 11, wherein the bit is a plug cutter.

13. The bit of claim 12, wherein the post retracts within the housing when drilling pressure is applied to the bit.

14. A bit for a tool, comprising:
    (a) a housing having a cutting portion and a shank;
    (b) a post reciprocally disposed within the housing and configured for slidable movement between an extended position and a retracted position and rotational movement within the housing, wherein the post extends from the cutting portion of the housing when the post is in the extended position and is positioned to assist in retaining the bit in a localize area of a work piece during use and wherein the post is capable of slidable and rotational movement within the housing when the post is in the extended position; and (c) a bearing surface disposed between the housing and the post.

15. The bit of claim 14, further comprising a biasing member disposed within the housing and positioned to reciprocate the post between the extended position and the retracted position in response to a drilling pressure applied to the bit.

16. A bit for a tool, comprising:
   (a) a housing having a cutting portion and a shank;
   (b) a post slidably disposed within the housing between an extended position and a retracted position and configured for rotational movement within the housing, wherein the post extends from the cuffing portion of the housing when the post is in the extended position and is positioned to assist in anchoring the bit to a workpiece when an initial drilling pressure is applied during use and wherein the post is capable of slidable and rotational movement within the housing when the post is in the extended position; and
   (c) a biasing member disposed within the housing and positioned to normally urge the post into the extended position.

* * * * *

UNITED STATES PATENT AND TRADEMARK OFFICE
CERTIFICATE OF CORRECTION

PATENT NO. : 7,578,324 B2  Page 1 of 1
APPLICATION NO. : 10/835894
DATED : August 25, 2009
INVENTOR(S) : N. Cantlon It is certified that error appears in the above-identified patent and that said Letters Patent is hereby corrected as shown below:

| COLUMN | LINE | ERROR |
| --- | --- | --- |
| 4 (Claim 5, | 2 line 10) | "localize" should read --localized-- |
| 4 (Claim 10, | 32 line 6) | "cuffing" should read --cutting-- |
| 4 (Claim 11, | 40 line 2) | "cuffing" should read --cutting-- |
| 4 (Claim 11, | 45 line 6) | "cuffing" should read --cutting-- |
| 4 (Claim 14, | 64 line 9) | "localize" should read --localized-- |
| 6 (Claim 16, | 1 line 6) | "cuffing" should read --cutting-- |

Signed and Sealed this

Fifth Day of January, 2010

David J. Kappos
*Director of the United States Patent and Trademark Office*